United States Patent [19]

Ohi

[11] Patent Number: 4,835,574

[45] Date of Patent: May 30, 1989

[54] AUTOMATIC PHOTOSENSITIVE MATERIAL CONVEYING APPARATUS

[75] Inventor: Michio Ohi, Moriyama, Japan

[73] Assignee: Dainippon Screen Mfg. Co., Ltd., Japan

[21] Appl. No.: 65,928

[22] Filed: Jun. 24, 1987

[30] Foreign Application Priority Data

Jun. 27, 1986 [JP] Japan ............................ 61-99459[U]

[51] Int. Cl.[4] ........................ G03B 27/32; G03B 27/52

[52] U.S. Cl. .................................... 355/27; 355/100; 355/106; 271/279; 271/270; 271/202

[58] Field of Search ................... 355/27, 28, 100, 106; 271/285, 286, 279, 280, 270, 202, 203

[56] References Cited

U.S. PATENT DOCUMENTS 2,430,687 11/1947 Sabel et al. ............................ 355/27

4,678,172 7/1987 Faltin .................................. 271/202

*Primary Examiner*—Monroe H. Hayes

*Attorney, Agent, or Firm*—Ostrolenk, Faber, Gerb & Soffen

[57] ABSTRACT

An automatic photosensitive material conveying apparatus to be disposed between an recording apparatus and a developing apparatus having different conveying velocities. The conveying apparatus comprises an inlet for receiving the photosensitive material from the recording apparatus, an outlet for feeding the photosensitive material to the developing apparatus, a first and a second conveying units extending between the inlet and the outlet in parallel to each other, and a guide mechanism switchable between a position to guide the photosensitive material to the first conveyor unit and a position to guide the photosensitive material to the second conveyor unit. Each of the conveying units is selectively driven at the conveying velocity of the recording apparatus and that of the developing apparatus.

11 Claims, 3 Drawing Sheets

AUTOMATIC PHOTOSENSITIVE MATERIAL CONVEYING APPARATUS

BACKGROUND OF THE INVENTION

The present invention relates to an automatic photosensitive material conveying apparatus, and more particularly to an automatic conveying apparatus to be disposed between a recording apparatus which records an image to be reproduced on a photosensitive material which is fed at a predetermined velocity, and an automatic developing apparatus which develops the photosensitive material recorded which is fed at a different velocity from that in the recording apparatus. The conveying apparatus transports the photosensitive material automatically and efficiently from the recording apparatus to the developing apparatus.

There has been commercially used a scanner which as continuously feeds film into a recording unit, in which an image to be reproduced is recorded on the film through slit exposure or flying beam spot exposure, and the continuous film is cut into sheets and is discharged from a discharge port of the recording apparatus (hereinafter referred to as merely "scanner").

It would be convenient to directly connect the discharge port of the recording apparatus to an entrance port of the automatic developing apparatus to void the need for an operator to perform several intermediate operations.

It is impossible, however, to carry out to achieve this result by simply converting the automatic developing apparatus to the recording apparatus, because there is normally a difference in advancing speed of the photosensitive material between the recording stage of the scanner and the developing stage at the developing apparatus.

In order to solve this problem, a conventional example of such connection, as shown in FIG. 4 of the accompanying drawings, is effected by means of a conveying apparatus 5 interposed between an outlet of the scanner 1 and inlet of the developing apparatus 2. The conveying apparatus 5 includes a conveyor unit 4 having a length L greater than a maximum length of photosensitive material 3 to be transported. Conveying velocity $V_{AT}$ of this conveyor unit 4 is maintained equal to material advance velocity $V_1$ of the scanner 1 during the time that the photosensitive material 3 is discharged from the scanner 1, and is switched to be equal to the material advance velocity $V_2$ of the developing apparatus 2 after the tail end of photosensitive material 3 is completely discharged from the scanner 1, that is after the photosensitive material 3 is cut by a cutter 6 at the outlet of the scanner 1 and delivered to the conveyor unit 4.

In the above construction, however, the conveying velocity $V_{AT}$ in the conveying apparatus 5 must be maintained equal to the advance velocity $V_2$ at the developing apparatus 2 while the photosensitive material 3 is fed from the conveying apparatus 5 to the developing apparatus 2, and during this period the next sheet of photosensitive material 3 cannot be fed from the scanner 1 to the conveyor unit 4. Generally, the advance velocity $V_2$ at the developing apparatus 2 is a low velocity in the order of 50 cm/min. though it normally is higher than the advance velocity $V_1$ at the scanner 1. It follows that the discharge from the scanner 1 of the next sheet of photosensitive material 3 must wait a long time until the preceding sheet of photosensitive sensitive material 3 is completely transferred from the conveying apparatus 5 to the developing apparatus 2. This impedes efficient use of the scanner 1. Assuming that the sheet of photosensitive material 3 has a length 1, the time taken for the leading end of the sheet to reach the inlet of developing apparatus 2 is $(L-1)/V_1$ and the time taken after this point of time for the tail end of the sheet to enter the developing apparatus 2 completely is $1/V_2$. Therefore, the time consumed after the photosensitive material 3 is cut until the succeeding portion of photosensitive material 3 is ready for printing, namely the waiting time of the scanner 1, is;

$$(L-1)/V_1+(1/V_2)$$

For expediency of calculation the above formula assumes that a cutter 6 is located at the outlet of scanner 1. (This applies also to other formulae to appear in this specification.)

FIG. 5 shows a schematic view of another conventional conveying apparatus, which has been proposed as an improvement upon the foregoing known example. This conveying apparatus 5 inclues two conveyor units 4*a*, 4*b* arranged in series along the photosensitive material passage between the outlet of surface scanner 1 and the inlet of developing apparatus 2, each conveyor unit having a length L greater than a maximum length of photosensitive material 3 to be transported. Conveying velocity $V_{AT}$ of the conveyor units 4*a*, 4*b* is switchable in three levels, i.e. a velocity corresponding to the material advance velocity $V_1$ at the scanner 1, a velocity corresponding to the advance velocity $V_2$ at the developing apparatus 2, and a velocity $V_3$ higher than these velocities. Conveying velocity $V_{AT}$ of the first conveyor unit 4a is maintained equal to the advance velocity $V_1$ at the scanner 1 while the photosensitive material 3 is moving from the outlet of scanner 1 to the first conveyor unit 4*a*. The first and second conveyor units 4*a*, 4*b* are switched to and maintained at velocity $V_3$ after the tail end of photosensitive material 3 reaches the first conveyor unit 4*a*, i.e. after the photosensitive material 3 is cut by a cutter 6 at the outlet of the scanner 1, until the leading end of the photosensitive material 3 reaches the inlet of the developing apparatus 2. Thereafter the conveying velocity $V_{AT}$ of the second conveyor unit 4*b* is switched to be equal to the advance velocity $V_2$ at the developing apparatus 2. Thus, the apparatus effects a speed increase for the intermediate part of conveyance.

However, such the apparatus still leaves the problem concerning efficient use of the scanner 1 unsolved. That is, conveying velocity $V_{AT}$ of the first conveyor unit 4a is set to the velocity $V_3$, which is different from the advance velocity $V_1$ at the scanner 1, during the period from cutting of the photosensitive material 3 by the cutter 6 at the outlet of the scanner 1 to the transfer of the resulting tail end to the second conveyor unit 4*b*. Only after lapse of this period is the scanner 1 allowed to discharge the succeeding portion of the photosensitive material 3. In this instance, the waiting time of the scanner 1 corresponds to the period from the cutting of the photosensitive material 3 to the completion of the transfer of the resulting tail end to the second conveyor unit 4*b* permitting the next portion of the photosensitive material 3 to be printed. Thus the waiting time may be expressed by the formula $L/V_{AT}$. Moreover, this apparatus not only requires complicated controls for switching the conveying velocity $V_{AT}$ of conveyor units 4*a*, 4*b* but has the problem of increased chances of damage done to the photosensitive material 3 as a result of the high-speed intermediate conveyance.

SUMMARY OF THE INVENTION

Having regard to the above-noted problem, the object of the present invention is to provide an automatic photosensitive material conveying apparatus effective to improve the working efficiency of the recording apparatus, i.e. scanner. More particularly, the invention intends to provide an automatic photosensitive material conveying apparatus which permits the recording apparatus to discharge a photosensitive material immediately after a preceding photosensitive material is fed into the conveying apparatus without imposing a waiting time upon the recording apparatus, such a conveying apparatus being operable at different conveying velocities which are readily switchable.

In order to achieve the above objects, an automatic photosensitive material conveying apparatus according to this invention is disposed between a recording apparatus and a developing apparatus to transport a photosensitive material from the recording apparatus to the developing apparatus, the recording apparatus being operable to record an image on the photosensitive material while feeding and advancing the photosensitive material at a first velocity and to cut and discharge the photosensitive material, and the developing apparatus being operable to develop the exposed photosensitive material by advancing the photosensitive material through processing baths of the developing apparatus at a second velocity, the automatic photosensitive material conveying apparatus comprising an inlet for receiving the photosensitive material from the recording apparatus, an outlet for feeding the photosensitive material to the developing apparatus, a first and a second conveying units extending between the inlet and the outlet in parallel to each other, the first and second conveying units being selectively driven at the first velocity and the second velocity for transporting the photosensitive material, and guide means switchable between a position to guide the photosensitive material to the first conveyor unit and a position to guide the photosensitive material to the second conveyor unit.

In the above construction, while the exposed photosensitive material previously fed into one of the conveyor units is in the process of transfer to the developing apparatus through the outlet of the conveyor apparatus, a succeeding photosensitive material is fed to the other conveyor unit through the inlet of the conveying apparatus. This conveying situation is alternated between the two conveyor units, whereby the exposure apparatus is operable continuously without a waiting time. The switching between the two conveyor units for conveying the photosensitive material is readily effected through the guide means mentioned above.

In other words, the automatic conveying apparatus of this invention has a sufficient conveying capacity to permit the exposure apparatus to process and discharge one strip of photosensitive material after another. The recording apparatus becomes ready for a next recording operation almost immediately after delivering the photosensitive material to the conveyor apparatus and cutting off an exposed portion of the material. The waiting time, if any, corresponds to only a brief time necessary for switching the guide means. Thus, the recording apparatus is now operable with increased efficiency.

The conveying apparatus according to the present invention has a further feature that each conveyor unit is switchable between the first velocity in the recording apparatus and the second velocity in the developing apparatus, the second velocity being higher than the first. This feature assures a smooth transfer of the photosensitive material from the recording apparatus to the conveying apparatus and from the conveying apparatus to the developing apparatus. Since the conveying apparatus does not involve a third conveying velocity higher than the second velocity noted above, the photosensitive material is free from damage as encountered in the prior arts.

Other features and advantages of the invention will become apparent from the following description.

BRIEF DESCRIPTION OF THE DRAWINGS

The drawings illustrate an automatic photosensitive material conveying apparatus embodying the present invention, in which.

DETAILED DESCRIPTION OF THE PREFERRED EMBODIMENT

Figure 1:
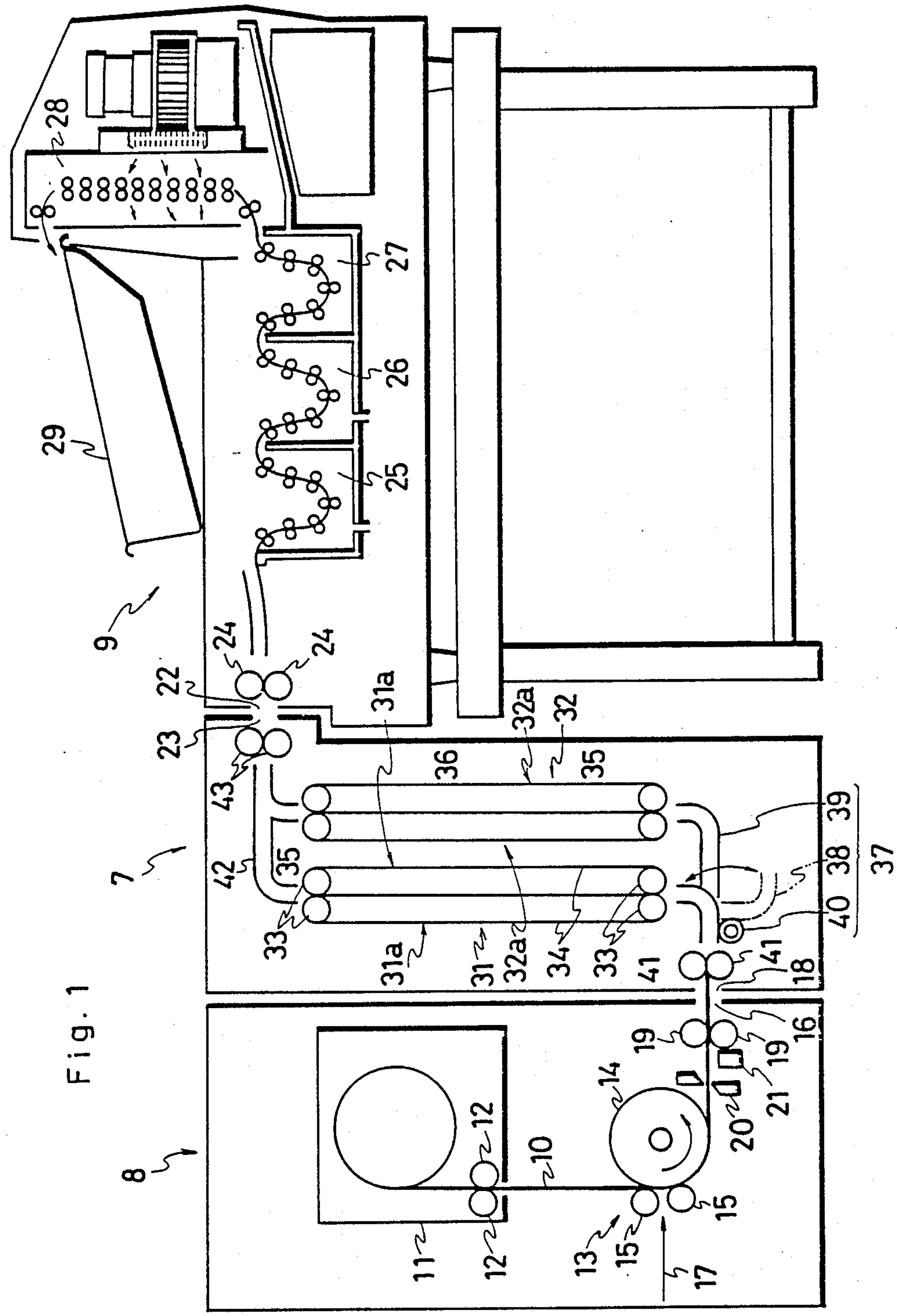
FIG. 1 is a vertical sectional view of the conveying apparatus according to the invention, as disposed between a recording apparatus and a developing apparatus.

Referring to FIG. 1, an automatic photosensitive material conveying apparatus 7 according to the present invention is disposed between a scanner 8 and an automatic developing apparatus 9. The scanner 8 houses a rolled film 10, which is one example of photosensitive material, mounted in a film magazine 11. The film 10 is fed downwardly through a pair of light-shielding rollers 12 to an recording station 13. The recording station 13 includes a drive roller 14 for advancing the film 10 and directing it to proceed horizontally, and a pair of press rollers 15 rotatable with the drive roller 14 while pressing the film 10 upon a peripheral surface of the drive roller 14. The drive roller 14 is driven by a driving mechanism (not shown), e.g. a pulse motor, to rotate at a constant peripheral velocity, thereby to advance the film 10 pressed by the press roller 15 into tight contact with the peripheral surface thereof toward an outlet 16 of the scanner 8 at constant velocity $V_1$. The film 10 is exposed at the recording station 13 by a light beam 17 emitted from a light source (not shown). The light beam 17 is caused to scan the film 10 transversely by a deflector such as a galvanomirror in suitable cycles through a space between the two press rollers 15. The light beam 17 is modulated in accordance with image signals by a modulator (not shown), e.g. an acoustic optical light modulator, and a desired image is recorded on the film 10 transversely scanned by the light beam 17. The outlet 16 of the scanner 8 is opposed to an inlet 18 of automatic conveying apparatus 7, and a pair of feed rollers 19 provided adjacent to the outlet 16 feeds the exposed film 10 to the conveying apparatus 7. The scanner 8 further includes a cutter 20 disposed upstream of the feed rollers 19, and a detector 21, e.g. a photosensor, disposed between the feed rollers 19 and the cutter 20 for detecting the leading end and tail end of a cut strip of film 10.

The developing apparatus 9 includes an inlet 22 opposed to an outlet 23 of the automatic conveying apparatus 7 and feed rollers 24 disposed adjacent to the inlet 22 for receiving the exposed film 10 from the conveying apparatus 7. In the developing apparatus 9, the film 10 is advanced at a velocity $V_2$ which is higher than the film advance velocity $V_1$ at the scanner 8, to proceed through a developing bath 25, a fixing bath 26 and a washing bath 27. The film 10 developed through this process is dried at a drying section 28 and discharged onto a discharge tray 29.

The film 10 is transported from the scanner 8 to the developing apparatus 9 by way of the automatic conveying apparatus 7 which comprises a first conveyor unit 31 and a second conveyor unit 32 extending parallel to each other between the inlet 18 and the outlet 23 of the conveying apparatus 17. Since in the illustrated example the inlet 18 is disposed at a lower portion of the conveying apparatus 17 and the outlet 23 at an upper portion thereof, the two conveyor units 31 and 32 extend vertically one behind the other. The first conveyor unit 31 includes an opposed pair of belt conveyors **31*a* each including rollers 33 and an endless belt 34. Similarly, the second conveyor unit 32 includes an opposed pair of belt conveyors 32*a* each including rollers 35 and an endless belt 36. Each opposed pair of belt conveyors 31*a* and 32*b* nips and conveys the film 10 upwardly. Each of the conveyor units 31, 32 has a length exceeding a maximum length of film 10 fed into the conveying apparatus 17**.

The conveying apparatus 17 further comprises a switchable guide mechanism 37 disposed between the inlet 18 and forward or lower ends of the conveyor units 31 and 32 for receiving cut strips of film 10 entering through the inlet 18 and guiding the strips alternately into the conveyor units 31 and 32. The guide mechanism 37 includes a first film guide 38 and a second film guide 39 arranged parallel to each other transversely of the inlet 18. The first film guide 38 has an approximately L-shaped configuration extending horizontally from a position opposed to the inlet 18 and then upwardly to a position close to the forward end of the first conveyor unit 31. Similarly, the second film guide 39 has an approximately L-shaped configuration extending horizontally from a position opposed to the inlet 18 and then upwardly to a position close to the forward end of the second conveyor unit 32. The first film guide 38 is pivotably attached to a stationary part of the conveying apparatus 17 through a hinge 40, whereas the second film guide 39 is fixed to the abovementioned posture. The first film guide 38 is switchable in response to control signals between a position connected to the first conveyor unit 31 as shown in solid lines in FIG. 1 and a position separated from the first conveyor unit 31 as shown in broken lines in FIG. 1. In the solid line position, the first film guide 38 guides the film 10 to the first conveyor unit 31 without allowing the film 10 to enter the second film guide 39. When the first film guide 38 is in the broken line position, the film 10 is allowed to enter the second film guide 39 to be guided to the second conveyor unit 32. Further, feed rollers 41 are interposed between the inlet 18 and the guide mechanism 37.

The first and second conveyor units 31 and 32 are connected at the rear or upper ends thereof to the outlet 23 of the conveying apparatus 17 by means of a film guide 42. This film guide 42 extends from the outlet 23 and bifurcates toward positions opposed to the rear ends of the conveyor units 31 and 32. Feed rollers 43 are interposed between the film guide 42 and the outlet 23.

The first and second conveyor units 31, 32 are controllably switched between a conveying velocity equal to the film advance velocity $V_1$ at the scanner 8 and a conveying velocity equal to the film advance velocity $V_2$ at the developing apparatus 9. Further, the leading end and tail end of film 10 are detected as follows. A counter is incremented by means of pulses generated in synchronism with the rotation of the first and second conveyor units 31, 32 and the rollers 12, 14, 15, 19 in the scanner 8 and by reference to generation timing of detection signals of the detector 21 in the scanner 8. The leading end and tail end of the film 10 may be detected by using, instead of the counter, a shift register. In this case, the detection signals of detectors 21 are shifted by means of pulses synchronized with the roller rotation. It is also possible to employ a microswitch.

Figure 2:
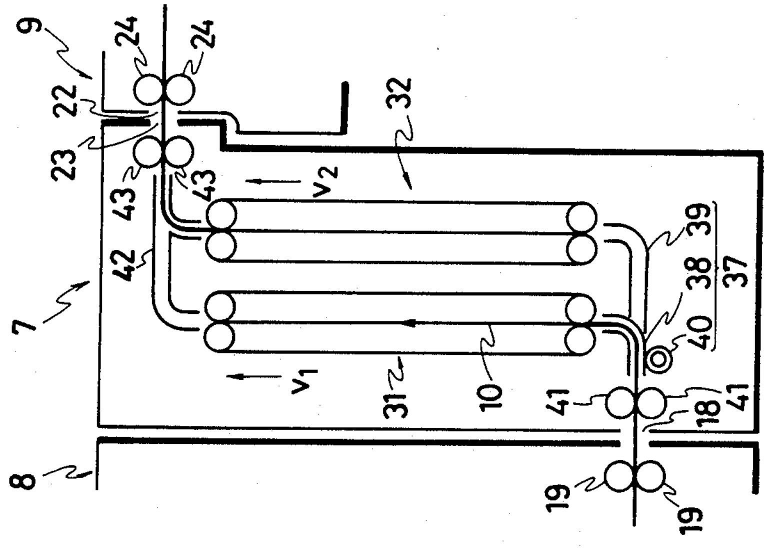
FIG. 2 is a vertical sectional view of the conveying apparatus in a first operative position.

How the film 10 is transported through the automatic conveying apparatus 7 will now be described. First, all the rollers in the scanner 8, including drive roller 14 and a pair of press rollers 15, rotate to advance the film 10 at velocity $V_1$ and at the same time the film 10 is exposed to light beam 17 at the recording station 13. When the leading end of film 10 moves past a pair of the feed rollers 19 and reaches the inlet 18 of conveying apparatus 7, the feed rollers 41 and the first conveyor unit 31 start rotating at the film advance speed $V_1$ of the scanner 8. At this time the first film guide 38 of the switchable guide mechanism 37 is connected to the first conveyor unit 31 as shown in FIG. 2, whereby the film 10 entering the conveying apparatus 7 is allowed to move into the first conveyor unit 31 through the feed rollers 41 and first film guide 38.

After the exposure in the scanner 8 is completed, the film 10 continues to move onward. When the tail end of a frame, within which an image to be reproduced is formed, on the film 10 comes to a position slightly downstream of the cutter 20, all the rollers in the scanner 8 and the feed rollers 41 and first conveyor unit 31 in the automatic conveying apparatus 7 stop rotating, thereby to stop the film advance. Then the cutter 20 is operated to cut the film 10 at a position adjacent to the tail end of the image.

Figure 3:
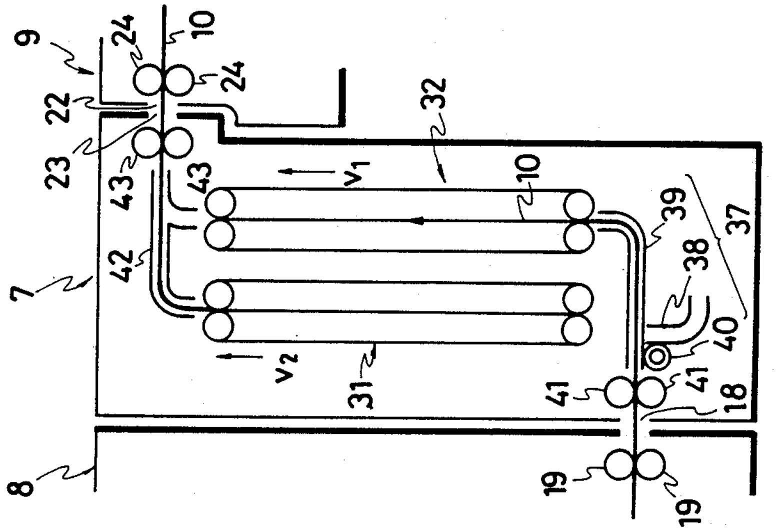
FIG. 3 is a vertical sectional view of the conveying apparatus in a second operative position.
Figure 4:
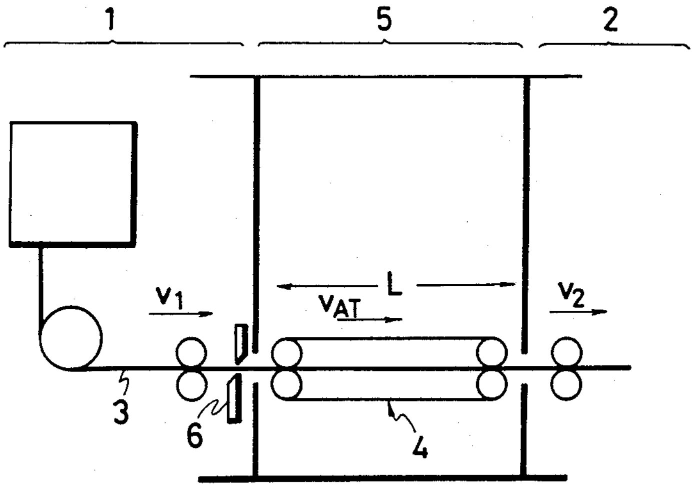
Fig. 4 Prior Art
FIGS. 4 and 5 are respectively schematic view illustrating conventional apparatus.
Figure 5:
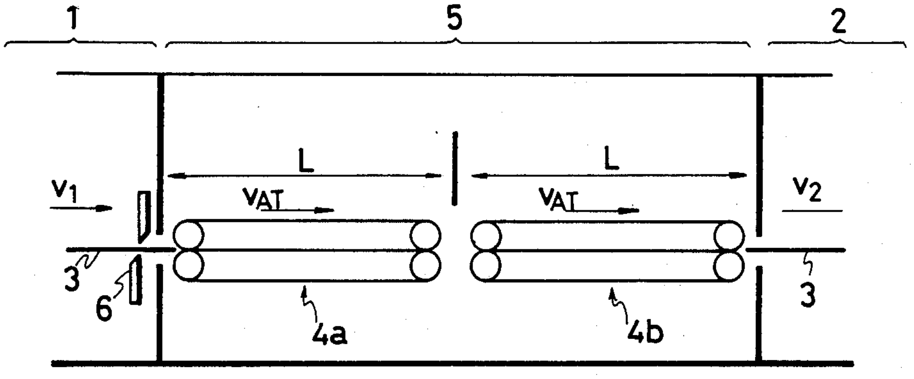
Fig. 5 Prior Art

Next, the first conveyor unit 31 and feed rollers 19, 41, 43 and 24 start rotating at the conveying velocity equal to the film advance velocity $V_2$ of the developing apparatus 9, whereby the cut film 10 is transported from the first conveyor unit 31 through film guide 42 to developing apparatus 9. In the course of the above conveyance, the tail end of the film 10 moves from the first film guide 38 of the switchable guide mechanism 37 to the first conveyor unit 31. Upon completion of this movement to the first conveyor unit 31, the first film guide 38 is pivoted downwardly to the position disconnected from the first conveyor unit 31 as shown in FIG. 3. This switching operation connects the inlet 18 of the automatic conveying apparatus 7 to the second conveyor unit 32 through the second film guide 39. Then, the second film guide 39 is driven at the conveying velocity equal to the film advance velocity $V_1$ of the scanner 8 and the feed rollers 19 and 41 are switched from velocity $V_2$ to velocity $V_1$.

In parallel with these operations, the portion of the film 10 remaining in the scanner 8 after the cutting is rewound until the cut end is drawn backward to a position adjacent to the exposure station 13 to be ready for a further recording. This portion of the film 10 discharged from the scanner 8 is fed into the second conveyor unit 32 of the conveying apparatus 7 through the feed roller 41 and the second film guide 39. That is, as shown in FIG. 3, while the preceding strip of film 10 is transported at velocity $V_2$ from the first conveyor unit 31 to the developing apparatus 9, the succeeding portion of film 10 is admitted into the conveying apparatus 7 by the second film guide 39 at velocity $V_1$. This succeeding portion, as is the preceding strip, is stopped when the terminal end of an image recording thereon reaches the position slightly upstream of the cutter 20 (as a result of the rollers in the scanner 8 and the feed rollers 41 and second film guide 39 stopping for a moment), to be cut by the cutter 20.

Next, the second conveyor unit 32 and feed rollers 19 and 41 start rotating at the conveying velocity equal to the film advance velocity $V_2$ of the developing apparatus 9, whereby the cut film 10 is transported from the second conveyor unit 32 through film guide 42 to the developing apparatus 9. Upon completion of transfer of the tail end of film 10 from the second film guide 39 to second conveyor unit 32, the first film guide 38 is pivoted upwardly back to the position connected to the first conveyor unit 31 as shown in FIG. 2. This switching operation connects the inlet 18 of the automatic conveying apparatus 7 to the first conveyor unit 31 through the first film guide 38. At the same time, the first conveyor unit 31 and the feed rollers 19 and 41 are switched from velocity $V_2$ to velocity $V_1$ to be ready for a next strip of film 10. As described hereinbefore, each of the first and second conveyor units 31, 32 has a conveying passage length exceeding a maximum length of film 10 and the developer 9 advances the film 10 at velocity $V_2$ which is higher than film advance velocity $V_1$ of the scanner 1. Therefore, by the time the leading end of the strip of film 10 conveyed through the second conveyor unit 32 reaches the film guide 42, the tail end of the preceding strip of film 10 conveyed through the first conveyor unit 31 is already well inside the developing apparatus 10. There is not possibility of the two strips overlapping each other in the course of conveyance.

The described sequence is repeated thereafter, with alternations of the admission of film 10 to the first conveyor unit 31 followed by the admission of the film 10 to the second conveyor unit 32 and the transfer of the film 10 from the first conveyor unit 31 to the developing apparatus 9 followed by the transfer of the film 10 from the second conveyor unit 32 to the developing apparatus 9. This permits the recording and development to be carried out in a continuous manner without imposing a waiting time upon the scanner 8.

The film advance velocity $V_1$ at the scanner 8 actually is about 1% higher than the conveying velocity corresponding thereto of the first and second conveyor units 31, 32. This difference is intended to eliminate a force which could be applied to the film 10 at the recording station 13 as a result of errors in roller diameters and others and which would lower printing precision. The film 10 therefore slackens slightly between the scanner 8 and automatic conveying apparatus 7. However, since the velocity difference is minimal and does not create any inconveniences for the foregoing conveyance which has been described on the assumption that the two velocities are equal.

Although the scanner is employed as a recording apparatus in the described embodiment, the automatic conveying apparatus according to the present invention may of course be used with various types of recording apparatus which records images on a photosensitive material while advancing the continuous film.

Further, in the described embodiment the first and second conveyor units are arranged to extend vertically in parallel, since there is a difference in height between the photosensitive material outlet of the recording apparatus and the photosensitive material inlet of the developing apparatus. The two conveyor units may of course extend horizontally in parallel, provided that there is no height difference between the above outlet and inlet. Moreover, the hinge 40 shown in FIGS. 1 through 3 which pivotably supports the first film guide 38 may be disposed at an upper position of this film guide 38 to permit the film guide 38 to swing in the direction opposite to the illustrated direction. This construction has the advantage of further reducing the waiting time.

I claim:

1. An automatic photosensitive material conveying apparatus to be disposed between a recording apparatus and a developing apparatus for conveying a photosensitive material from the recording apparatus to the developing apparatus, the recording apparatus being operable to record an image to be reproduced on the photosensitive material while feeding and advancing the photosensitive material at a first velocity and to cut and discharge the photosensitive material, and the developing apparatus being operable to develop the photosensitive material by advancing the photosensitive material through processing baths at a second velocity, different than said first velocity, said automatic photosensitive material conveying apparatus comprising:

an inlet connected to said recording apparatus for receiving the photosensitive material therefrom;

an outlet connected to said developing apparatus for feeding the photosensitive material thereto;

at least two conveying units extending between said inlet and said outlet for transporting the photosensitive material from the recording apparatus to the developing apparatus, each of said conveying units being selectively and independently driven at said first velocity when receiving said photosensitive material from said recording apparatus and said second velocity when outputting said photosensitive material to said developing apparatus;

said conveying units being operated simultaneously such that when some of said conveying units are receiving photosensitive material at said first velocity, the other conveying units are outputting photosensitive material at said second velocity to permit continuous conveying of said photosensitive material from said recorder apparatus to said developer apparatus; and, guide means switchable between a position to guide the photosensitive material to one of said conveying units and a position to gudie the photosensitive material to another of said units.

2. An automatic photosensitive material conveying apparatus as set forth in claim 1, wherein said inlet is defined at a lower position of the conveying apparatus and said outlet is defined at an upper position thereof, each of said conveying units including a pair of endless belts extending vertically through the conveying apparatus.

3. An automatic photosensitive material conveying apparatus as set forth in claim 2, wherein said guide means includes a first guide member pivotable between an operative position to connect one conveying unit to said inlet and a position to be retracted from said operative position, and a second guide member fixed to a position to connect another conveying unit to said inlet.

4. An automatic photosensitive material conveying apparatus as set forth in claim 3, wherein each of said first and second guide members has a substantially L-shaped configuration.

5. An automatic photosensitive material conveying apparatus as set forth in claim 4, wherein said first guide member is supported by a pivotal axis at a lower portion thereof.

6. An automatic photosensitive material conveying apparatus as set forth in claim 4, wherein said first guide member is supported by a pivotal axis at an upper portion thereof.

7. An automatic photosensitive material conveying apparatus as set forth in claim 1, wherein said conveying units extend horizontally through the conveying apparatus.

8. The conveying apparatus of claim 1, wherein said guide means is capable of guiding each successive sheet of photosensitive material to a conveying unit different from the conveying unit to which the immediately preceding sheet was guided.

9. Apparatus comprising:

a recording apparatus operable to record an image to be reproduced on a photosensitive material while feeding and advancing said photosensitive material at a first velocity and discharging said photosensitive material in sheet form at an outlet thereof;

a developing apparatus receiving said photosensitive sheet material at an input thereof and being operable to develop said photosensitive sheet material by advancing said photosensitive sheet material through processing baths at a second velocity, different than said first velocity;

a conveying apparatus including an inlet connected to said outlet of said recording apparatus for receiving said photosensitive sheet material therefrom and an outlet connected to said input of said developing apparatus for feeding said photosensitive sheet materials thereto and means for transporting said photosensitive sheet material from its inlet to its outlet in such a manner that said recording apparatus may discharge said photosensitive sheet material immediately after it has discharged a proceeding photosensitive sheet material without imposing a waiting time upon said recording apparatus, said means for transporting including at least two conveying units;

said at least two conveying units extending between said inlet and said outlet for transporting the photosensitive material from the recording apparatus to the developing apparatus, each of said conveying units being driven at said first velocity when receiving said photosensitive material from said recording apparatus and at said second velocity when outputting said photosensitive material to said developing apparatus;

said conveying units being operated simultaneously such that when some of said conveying units are receiving photosensitive material at said first velocity, the other conveying units are outputting photosensitive material at said second velocity to permit continuous conveying of said second velocity to permit continuous conveying of said photosensitive material from said recording apparatus to said developing apparatus.

10. The apparatus of claim 9, wherein said conveying apparatus further includes guide means capable of guiding each successive sheet of photosensitive material to a different conveying path than the immediately preceding sheet.

11. An apparatus comprising:

a recording apparatus operable to record an image to be reproduced on a photosensitive material while feeding and advancing said photosensitive material at a first velocity and discharging said photosensitive material in sheet form at an outlet thereof;

a developing apparatus capable of receiving said photosensitive sheet material at an input thereof and being operable to develop said photosensitive sheet material by advancing said photosensitive sheet material through processing baths at a second velocity different from said first velocity;

a conveying apparatus including an inlet connected to said outlet of said recording apparatus for receiving said photosensitive sheet material therefrom, and an outlet connected to said input of said developing apparatus for feeding said photosensitive sheet materials thereto;

first and second conveying units extending parallel to each other between said inlet and said outlet for transporting the photosensitive material from the recording apparatus to the developing apparatus, said first and second conveying units being selectively and independently driven at said first velocity when receiving said photosensitive material from said recording apparatus and said second velocity when outputting said photoconductive material to said developing apparatus;

said conveying units being operated simultaneously such that when some of said conveying units are receiving photosensitive material at said first velocity, the other conveying units are outputting photosensitive material at said second velocity, to permit continuous conveying of said photosensitive material from said recorder apparatus to said developer apparatus; and, guide means switchable between a position to guide the photosensitive material from said recording apparatus to said first conveying unit and a position to guide the photosensitive material to said second conveying unit, said guide means alternately conducting each successive sheet of photosensitive material from said recording apparatus to a conveying unit different from the conveying unit to which the immediately preceding sheet was conducted.

* * * * *